(12) United States Patent
Nakashima et al.

(10) Patent No.: US 6,687,216 B1
(45) Date of Patent: Feb. 3, 2004

(54) CARTRIDGE IN WHICH DISK IS STORED

(75) Inventors: Hiroshi Nakashima, Hirakata (JP); Noriaki Kitani, Hirakata (JP); Takao Enomoto, Takatsuki (JP); Hiroyoshi Takagi, Kameoka (JP); Hikaru Mizutani, Minoo (JP); Kenji Ohta, Kyoto (JP); Toshiyuki Toyofuku, Hachioji (JP)

(73) Assignees: Sanyo Electric Co., Ltd., Osaka (JP); Hitachi Maxell Co., Ltd., Osaka (JP); Olympus Optical Co., Ltd., Tokyo (JP)

( * ) Notice: Subject to any disclaimer, the term of this patent is extended or adjusted under 35 U.S.C. 154(b) by 92 days.

(21) Appl. No.: 10/019,309

(22) PCT Filed: Jul. 3, 2000

(86) PCT No.: PCT/JP00/04431
§ 371 (c)(1),
(2), (4) Date: Apr. 9, 2002

(87) PCT Pub. No.: WO01/04900
PCT Pub. Date: Jan. 18, 2001

(30) Foreign Application Priority Data

Jul. 9, 1999 (JP) .......................... 11-195182

(51) Int. Cl.⁷ ..................... G11B 23/03; G11B 23/033
(52) U.S. Cl. ..................... 369/291; 360/133
(58) Field of Search ................. 360/133; 369/291

(56) References Cited

U.S. PATENT DOCUMENTS

| 4,853,925 A | * | 8/1989 | Kaneuchi | 369/291 |
| 5,063,558 A | * | 11/1991 | Takahashi | 369/291 |
| 5,638,240 A | * | 6/1997 | Akiyama et al. | 360/133 |
| 5,724,217 A | * | 3/1998 | Oishi | 360/133 |
| 6,166,883 A | * | 12/2000 | Miyata et al. | 360/133 |

FOREIGN PATENT DOCUMENTS

| JP | 63-271782 | 11/1988 | |
| JP | 2-292689 | 12/1991 | |
| JP | 05189913 A | * 7/1993 | ........... G11B/23/03 |
| JP | 9-115264 | 5/1997 | |
| JP | 9-237479 | 9/1997 | |

* cited by examiner

Primary Examiner—William Klimowicz
(74) Attorney, Agent, or Firm—Westerman, Hattori, Daniels & Adrian, LLP

(57) ABSTRACT

A cartridge includes upper and lower half segments butting against each other and containing a disk, a shutter provided on one side of the cartridge half segments for exposing or alternatively enclosing the disk, and a torsion spring attached to the shutter for biasing the shutter in a closing direction. An insertion opening is formed in a side portion of the cartridge for permitting insertion of the torsion spring therethrough from outside, and a protective wall is provided upright between the insertion opening and the disk to define a space by the wall and the upper half segment. The space is so sized as to permit the torsion spring to pass therethrough while leaving a small clearance, with legs thereof directed laterally.

2 Claims, 5 Drawing Sheets

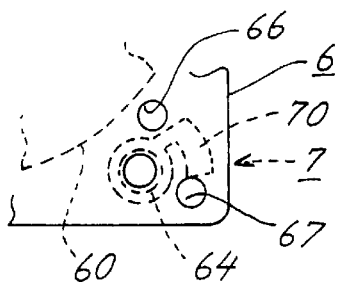
FIG. 4A
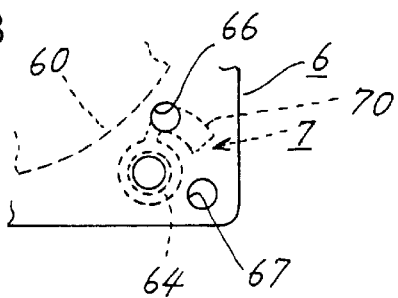
FIG. 4B
FIG. 5
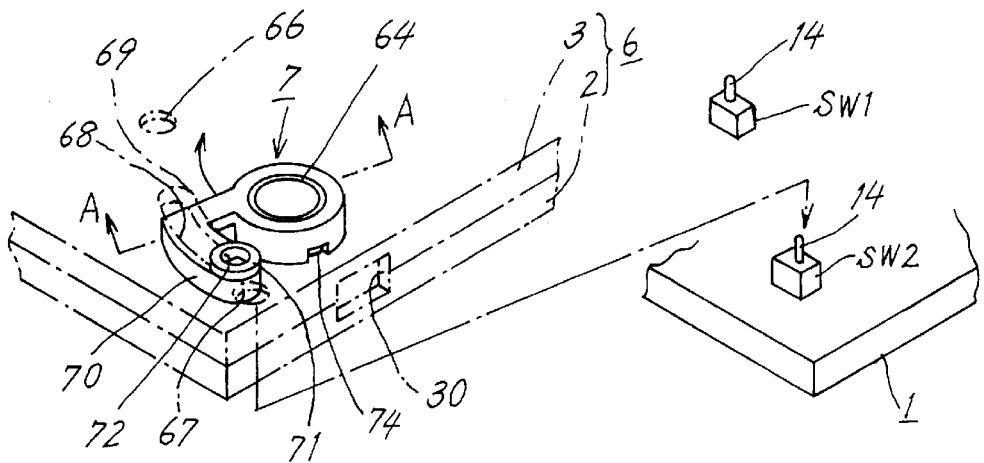
FIG. 6
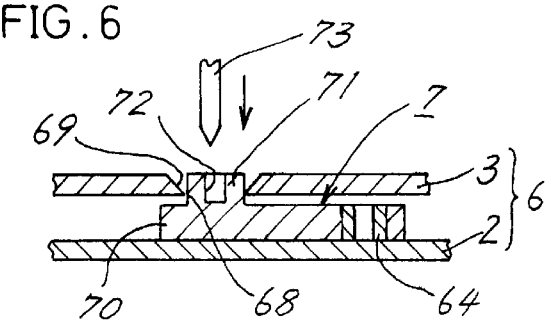

CARTRIDGE IN WHICH DISK IS STORED

TECHNICAL FIELD

The present invention relates to improvements in cartridges containing a disk serving as a recording medium.

BACKGROUND ART

FIG. 11 is a perspective view of a conventional cartridge 6. The cartridge 6 comprises a pair of upper and lower half segments 2, 3 butting against each other and contains a disk 60 serving as a recording medium. The upper half segment 3 has an aperture 61 formed in its top wall toward one side thereof for partly exposing the disk 60. The aperture 61 is opened or closed by a shutter 4 slidable on the cartridge 6. The cartridge 6 is inserted into a recording-playback device (not shown) in the same direction as the direction of movement of the shutter 4.

A slit 63 is formed in the side wall of the cartridge 6 over which the shutter 4 is provided. When the cartridge 6 is inserted into the recording-playback device, a tooth 10 fixedly provided in the device advances into the slit 63. The shutter 4 is held in engagement with the cartridge 6 by a lock mechanism (not shown). The tooth 10 advancing into the slit 63 unlocks the lock mechanism and pushes the shutter 4 open. In the following description, the direction of insertion of the cartridge into the device will be referred to as "front," and the opposite direction as "rear."

For recording or playback, the cartridge 6 is supported by prop pins 11 projecting upward from a chassis 1 as seen in FIG. 12. The chassis 1 has a turntable 12 and a pickup 13 mounted thereon. The cartridge 6 has formed in its bottom wall a window opening 62 for passing therethrough a beam from the pickup 13 and a through hole 26 for the turntable 12 to pass through. With the shutter 4 opened, the turntable 12 passing through the hole 26 rotates the disk 60, and the beam from the pickup 13 is projected onto the disk 60 through the window opening 62 for the regeneration of signals. For recording signals, a recording head (not shown) is brought into contact with the disk 60 through the aperture 61.

However, the cartridge described has the following problem.

With the cartridge 6 of FIG. 11, the shutter 4 remains open if released from the lock for one cause or another and opened inadvertently, consequently permitting extraneous matter in the air to readily pass through the aperture 61 and adhere to the disk 60. Accordingly, it appears useful to form an insertion opening 31 in the side wall of the cartridge 6 and insert a torsion spring 5 into the cartridge 6 through the opening 31 to bias the shutter 4 in a closing direction by the spring 5 as indicated in chain lines in FIG. 11. The expedient comprising a torsion spring 5 is already actually used, for example, for floppy disks, such that the shutter 4 is automatically closed if opened inadvertently.

The insertion opening 31 formed in the side wall of the cartridge 6 is nevertheless likely to permit ingress of extraneous matter through the opening 31. The extraneous matter will then cause damage to the disk 60 or interfere with the action of the torsion spring 5.

An object of the present invention is to provide a cartridge which has a torsion spring enclosed therein for biasing the shutter in the closing direction and which is diminished in the likelihood of extraneous matter ingressing into the cartridge through an insertion opening.

DISCLOSURE OF THE INVENTION

A cartridge 6 comprises half segments 2, 3 butting against each other. An insertion opening 31 is formed in a side portion of the assembly of the cartridge half segments 2, 3 for permitting insertion of a torsion spring 5 therethrough from outside.

A protective wall 20 is provided upright at the side portion of the half segments 2, 3 between the insertion opening 31 and a disk 60 to define a space by the wall and the upper half segment 3.

The space is so sized as to permit the torsion spring 5 to pass therethrough while leaving a small clearance, with legs 51 thereof directed laterally.

BRIEF DESCRIPTION OF THE DRAWINGS

FIG. 4A and FIG. 4B are rear views showing a portion of the cartridge in the vicinity of first and second discrimination holes.

FIG. 5 is a perspective view of a changeover lever and the cartridge.

FIG. 6 is a view in section taken along the line A—A in FIG. 5.

BEST MODE OF CARRYING OUT THE INVENTION

Overall Construction

An embodiment of the present invention will be described below in detail with reference to the drawings.

Figure 1:
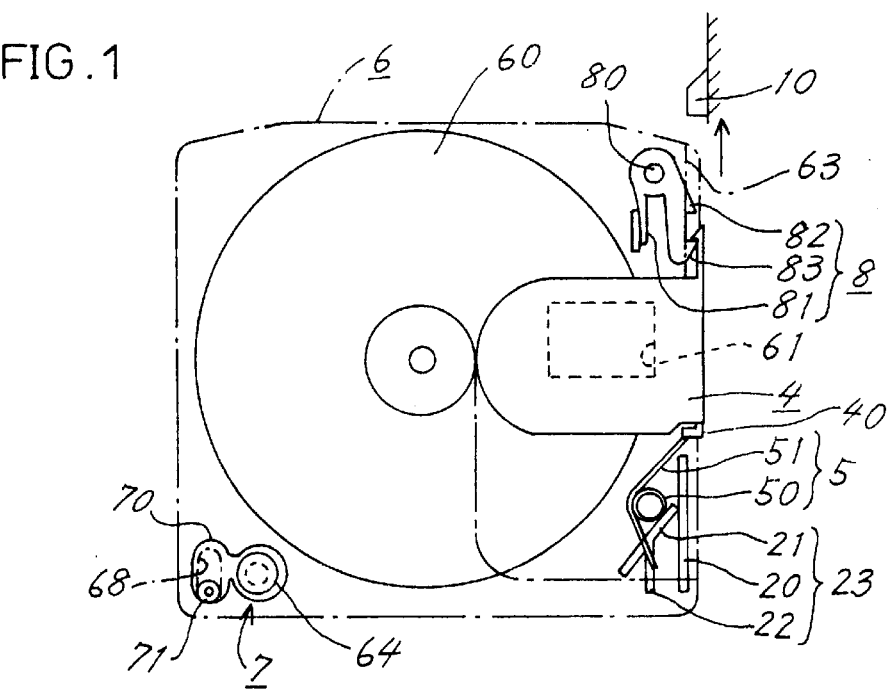
FIG. 1 is a plan view of a cartridge to show the contour of the cartridge in a chain line.
Figure 2:
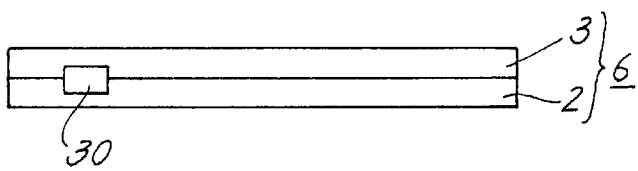
FIG. 2 is a front view of the same.
Figure 3:
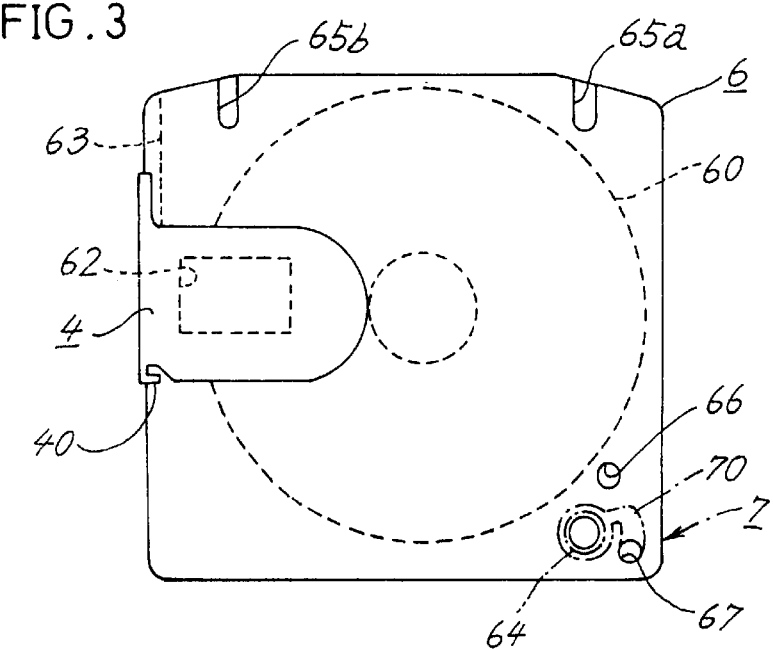
FIG. 3 is a rear view of the cartridge.

FIG. 1 is a plan view of a cartridge 6. The contour of the cartridge 6 is indicated in a chain line. FIG. 2 is a plan view of the same, and FIG. 3 is a rear view of the cartridge 6. As shown in FIG. 2, the cartridge 6 comprises a pair of upper and lower half segments 2, 3 and has an inspection window 30 formed in its rear end on the left side thereof.

With reference to FIGS. 1 and 3, the cartridge 6 has an aperture 61 and a window opening 62 formed respectively in its upper and lower walls for partly exposing a disk 60. A shutter 4 slidable on the cartridge 6 is provided over the aperture 61 and the window opening 62.

A slit 63 is formed in the right side wall of the cartridge 6 at the front end portion thereof. A lock lever 8 is pivoted as at 80 to the cartridge 6 in the vicinity of the slit 63. The lock lever 8 is made of a synthetic resin and integrally has an arm 81 deformable by deflection, a contact portion 82 projecting into the slit 63 and a hook 83 engaging with the shutter 4. The hook 83 is in engagement with the shutter 4, usually preventing the shutter 4 from moving inadvertently.

Figure 9:
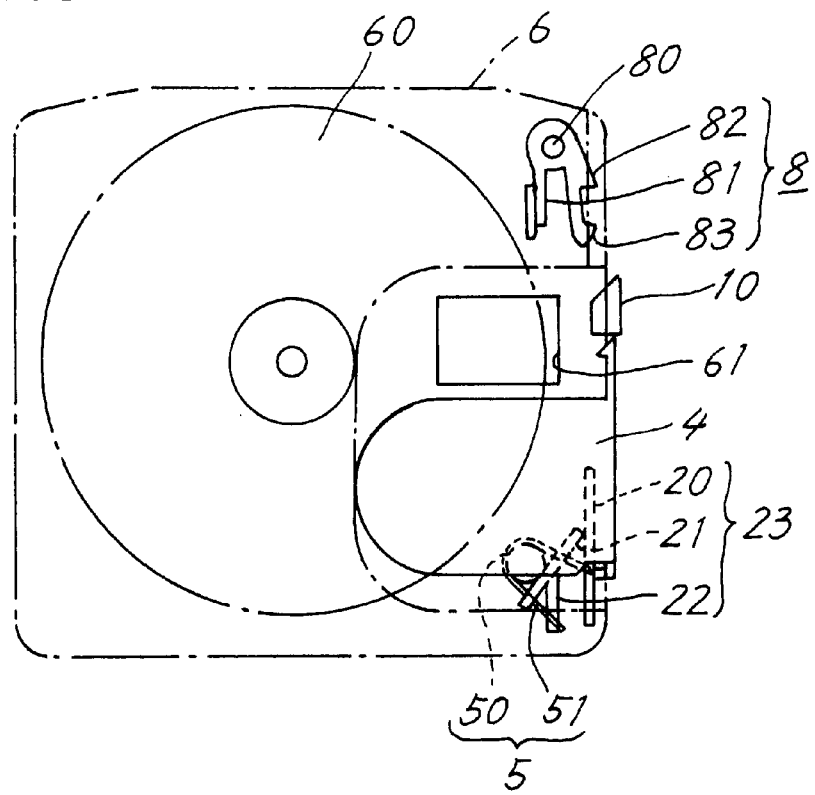
FIG. 9 is a plan view showing the shutter as opened.

The cartridge 6 is inserted into a recording-playback device (not shown). At this time, the shutter 4 is movable in the same direction as the direction of insertion. The device is provided with a tooth 10, which advances into the slit 63 and comes into contact with the contact portion 82, rotating the lock lever 8 clockwise while deforming the arm 81 by deflection. The hook 83 is brought out of engagement with the shutter 4, which moves rearward by being pushed by the tooth 10 to expose the aperture 61 as shown in FIG. 9. Upon the hook 83 moving past the tooth 10, the arm 81 restores itself elastically, turning the lock lever 8 counterclockwise to the original position.

A torsion spring 5 is provided inside the cartridge 6 of FIG. 1 for biasing the shutter 4 in a closing direction, and a wall arrangement 23 is provided upright in the vicinity of the torsion spring 5. As is well known, the torsion spring 5 comprises a pair of legs 51, 51 extending from a coil portion 50.

The wall arrangement 23 comprises a protective wall 20 opposed to the side wall of the cartridge 6, a guide wall 21 obliquely extending from the lengthwise midportion of the protective wall 20 rearwardly inward, and a small wall 22 extending from the approximate midportion of the guide wall 21 in parallel to the protective wall 20. One leg 51 of the torsion spring 5 is engaged with a retaining portion 40 of the shutter 4, and the other leg 51 thereof with the small wall 22. When the shutter 4 moves rearward, the coil portion 50 of the torsion spring 5 moves along the guide wall 21 (see FIG. 9). The protective wall 20 prevents extraneous matter from ingressing into the cartridge from outside as will be described later below.

Detection of Recordable Mode

The cartridge of the type described is provided with a mechanism for switching between a recordable mode and a nonrecordable mode when manipulated by the user so as to obviate the likelihood of recording signals on the disk 60 in error. This mechanism will be described below.

Figure 12:
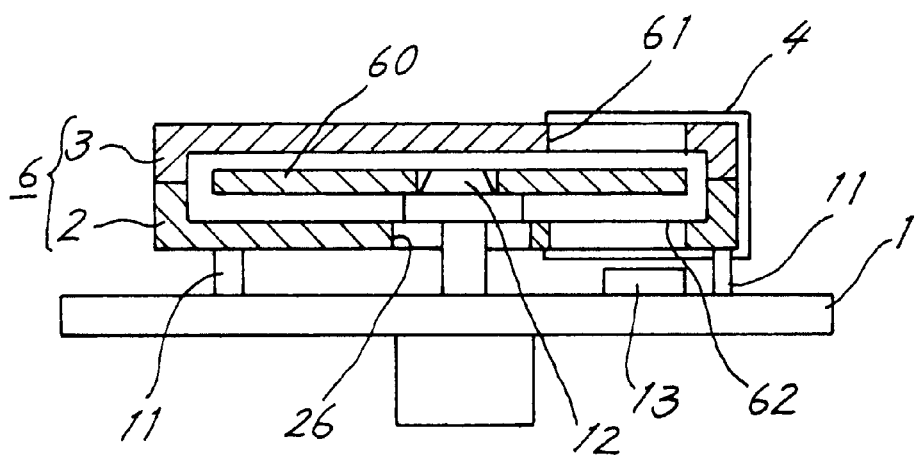
FIG. 12 is a front view in section of the cartridge as loaded on a chassis.

With reference to FIG. 3, the cartridge 6 is provided, at a rear end portion of its interior, with a boss 64 having an opening directed downward. Formed in the front end of rear surface of the cartridge 6 are a positioning groove 65a and an erroneous insertion preventing groove 65b for making it impossible to insert the cartridge 6 when to be inserted in a wrong direction, these grooves extending rearward. The cartridge 6 is supported by prop pins 11 (see FIG. 12) on a chassis 1 which are in contact with a portion around the boss 64, and side edge portions defining the grooves 65a, 65b. A changeover lever 7 is rotatably fitted around the boss 64 and has a cover 70 extending from the lever base end around the boss 64 toward the side wall of the cartridge 6. The boss 64 and the lever 7 have different colors; for example, the boss 64 is entirely white while the changeover lever 7 is entirely black.

Two first and second discrimination holes 66, 67 spaced apart from each other are formed in the rear wall of the cartridge 6 on the path of movement of the cover 70. As shown in FIG. 1, a circular-arc manipulation slit 68 is formed in the upper wall of the cartridge 6 in corresponding relation with the path of movement of the cover 70.

FIG. 5 is a perspective view of the changeover lever 7 and the cartridge 6. A pair of switches SW1, SW2 each having an anvil 14 are mounted on the chassis 1. The anvils 14 of the switches SW1, SW2 are fittable into the first and second discrimination holes 66, 67, respectively. The switches SW1, SW2 detect the disk as to whether it is in condition for recording depending on whether the discrimination hole 66 or 67 is closed with the cover 70. The switches SW1, SW2 are usually off. The switch is turned on when the cover 70 closing the corresponding hole 66 or 67 pushes the anvil 14.

FIGS. 4A, 4B are rear views showing a portion the cartridge in the vicinity of the first and second discrimination holes 66, 67. The first hole 66 is positioned forwardly and inwardly of the second hole 67. The cover 70 of the changeover lever 7 is movable between three positions, i.e., a position where the two discrimination holes 66, 67 are left exposed as seen in FIG. 4A, a position where the first discrimination hole 66 only is closed as shown in FIG. 4B, and a position where the second discrimination hole 67 only is closed as shown in FIG. 3. Thus, the user moves the changeover lever 7 to move the cover 70 to one of the three positions, whereby the mode is changed over to the signal recordable mode or to the nonrecordable mode.

If only the second discrimination hole 67 is closed as shown in FIG. 3, the switch SW2 corresponding to the second hole 67 has its anvil 14 pressed by the cover 70 and is therefore turned on, and the switch SW1 corresponding to the first hole 67 is off. At this time, the cartridge 6 is in the mode in which signals can be recorded on the disk 60. If only the first discrimination hole 66 is closed as shown in FIG. 4B, the switch SW1 is turned on, and the switch SW2 off by the cover 70. At this time, the cartridge 6 is in the mode in which no signals can be recorded on the disk 60. Accordingly, no signals are recorded on the disk 60 in error when the first hole 66 is held closed with the cover 70.

If both the holes 66, 67 are left open as shown in FIG. 4A, both switches SW1, SW2 are off. At this time, the cartridge 6 is in a so-called selective deletable mode, namely, in a mode in which signals can be recorded on the disk 60 in the area thereof where no data is recorded although the data already recorded on the disk 60 can not be deleted for recording.

As shown in FIG. 5, the cover 70 of the changeover lever 7 has a projection 71 projecting upward therefrom. The projection 71 is fitted in the manipulation slit 68 of the cartridge 6. The projection 71 has an outer end face which is flush with the upper surface of the cartridge 6 or positioned below the surface. A cavity 72 is formed in the top of the projection 71. The changeover lever 7 can be turned when a jig 73 having a sharp end and inserted into the cavity 72 as shown in FIG. 6 is moved along the slit 68 by the user.

The peripheral edge defining the slit 68 of the cartridge 6 is provided over the entire periphery thereof with a tapered face 69 sloping inwardly downward as shown in FIG. 6. Since it is likely that the user will manipulate the lever 7 with his fingers, the tapered face is provided to render the projection 71 readily accessible by the fingers. Especially, the user is likely to move with his fingers the lever 7 in the position of the selective deletable mode shown in FIG. 4A, so that the tapered face 69 is formed over the entire periphery of the slit-defining edge for the ease of manipulation. Alternatively, a stepped portion may be provided in place of the tapered face 69.

As seen in FIG. 6, the tapered face 69 has a lower end in contact with the base end of the projection 71, such that the projection 71 moves in frictional contact with the lower end of the tapered face 69. The changeover lever 7 therefore moves with slight friction and is unlikely to move from one mode position to the other mode position inadvertently.

Figure 10:
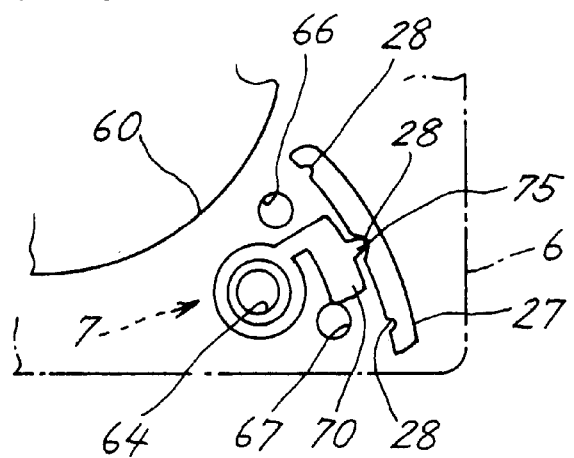
FIG. 10 is a rear view showing on an enlarged scale a portion having the first and second discrimination holes as other application example.
Figure 11:
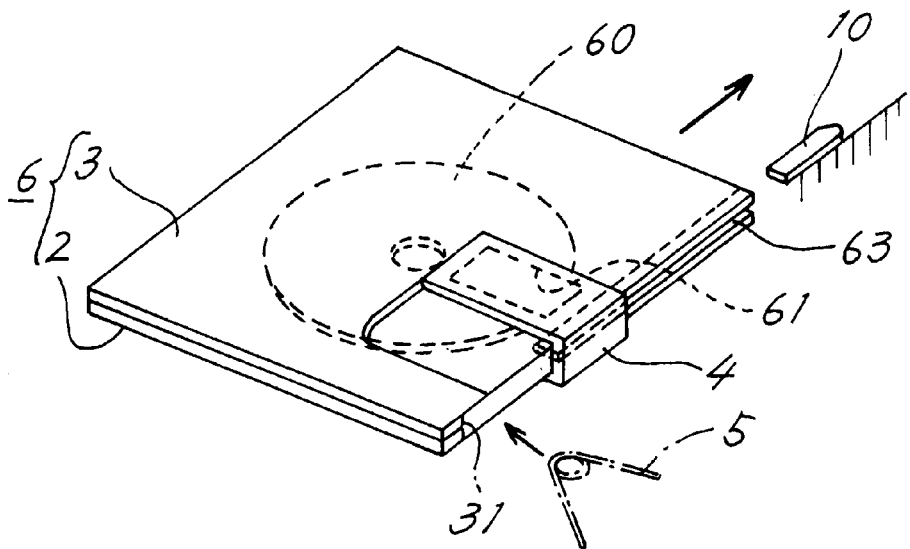
FIG. 11 is a perspective view of a conventional cartridge.

Further as shown in FIG. 10, a protuberance 75 is formed on the outer periphery of the cover 70, and a circular-arc wall 27 is provided alongside the path of movement of the cover 70. When the circular-arc wall 27 is provided in its inside face with recesses 28 for the protuberance 75 to fit in at positions corresponding to the respective modes, the protuberance 75 is fittable into the recess 28, with the cover 70 brought to one of the mode positions, to lightly retain the changeover lever 7.

Since the cover 70 is made of a synthetic resin, the protuberance 75 is easily deformable. When the lever 75 lightly in engagement with the circular-arc wall 27 is turned about the boss 64, the protuberance 75 is deformed by being deflected by contact with the wall portion defining the recess 28 and moves out of the recess 28, permitting the movement of the cover 70.

A cutout 74 is formed in a lower portion of the base end of the lever 7 shown in FIG. 5. The cutout 74 is opposed to the inspection window 30, with the cover 70 of the changeover lever 7 closing the second discrimination hole 67.

When the interior of the cartridge is seen through the inspection window 30 in this state, the periphery of the boss 64 can be seen through the cutout 74. Thus the user is able to recognize the white boss 64 through the window 30.

When the second discrimination hole 67 is exposed by a clockwise movement of the lever 7 about the boss 64, the cutout 74 is brought out of the position opposed to the inspection window 30. The periphery of the base end of the black changeover lever 7 can be seen through the window 30. In this way, the color observable through the inspection window 30 indicates whether the disk 60 is ready for recording.

Prevention of Ingress of Extraneous Matter

The present embodiment is characterized by diminishing the likelihood of extraneous matter ingressing into the cartridge 6 form outside to cause trouble to the action of the torsion spring 5.

Figure 7:
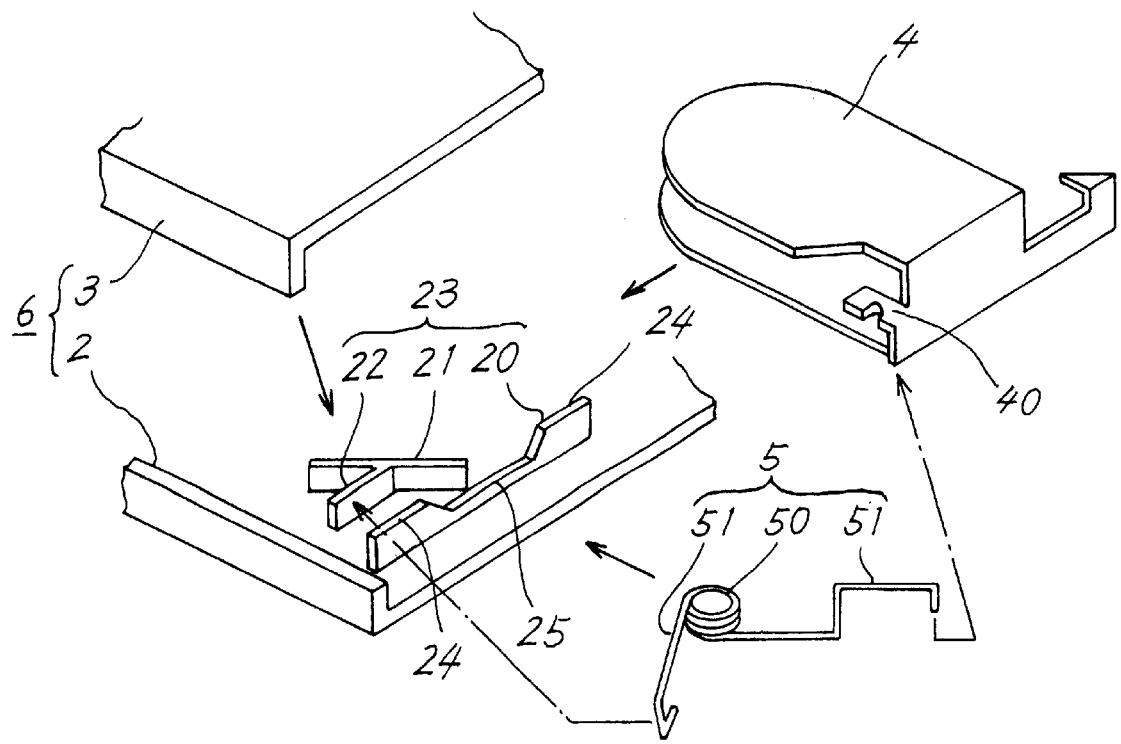
FIG. 7 is an exploded perspective view of cartridge half segments, a shutter and a torsion spring.
Figure 8:
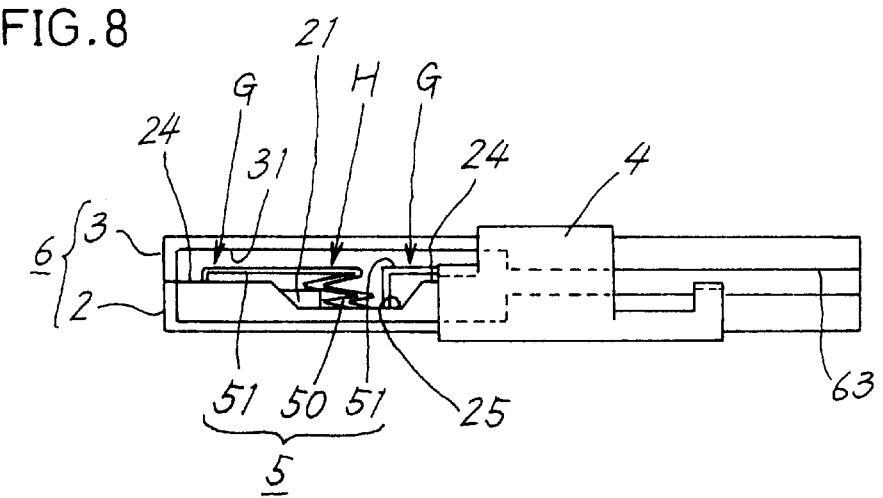
FIG. 8 is a right side elevation of the cartridge.

FIG. 7 is an exploded perspective view of the cartridge half segments 2, 3, shutter 4 and torsion spring 5, and FIG. 8 is a right side elevation of the cartridge 6. The wall arrangement 23 is provided on the lower half segment 2. The upper end of the protective wall 20 has first end faces 24 extending forward and rearward, and a second end face 25 positioned at a lower level than the first end faces 24 and continuous therewith. To install the torsion spring 5 in place, the shutter 4 is fitted over the half segments 2, 3 from one side after these segments are butted against each other. The torsion spring 5 is inserted through an insertion opening 31 formed across the two half segments 2, 3 as shown in FIG. 8, while deflecting the legs 51 of the spring 5, as directed outward, toward each other.

After the torsion spring 5 has been inserted into the cartridge 6, the coil portion 50 is positioned inwardly of the guide wall 21. The legs 51, 51 of the spring 5 restore themselves from deflection, one leg 51 comes into contact with the retaining portion 40 of the shutter 4, and the other leg 51 bears against the small wall 22. The shutter 4 is biased toward the closing direction.

Suppose the torsion spring 5 is inserted into the half segments 2, 3 and shutter 4 is thereafter fitted over these segments. It is then necessary to deform the legs of the spring 5 within the cartridge 6 and to bring the leg into contact with the shutter 4, hence a cumbersome procedure. Accordingly the shutter 4 is attached to the cartridge half segments 2, 3 as butted against each other, and the torsion spring 5 is thereafter inserted into the cartridge 6.

In installing the torsion spring 5 in the cartridge 6, each leg 51 of the spring 5 is passed through a space G defined by the upper half segment 3 and each first end face 24 of the protective wall 20. The coil portion 50 of the spring 5 is passed through a space H defined by the upper half segment 3 and the second end face 25 of the protective wall 20 while leaving a small clearance. Thus, the space H is given a minimum height which enables the coil portion 50 of the torsion spring 5 to pass through the space H.

Reducing the vertical width of the space G and the space H in this way diminishes the likelihood that extraneous matter from outside will ingress into the cartridge 6 through the insertion opening 31. In other words, extraneous matter is likely to enter the cartridge 6 to cause trouble to the action of the torsion spring 5 if no protective wall 20 is provided, whereas the protective wall 20 is provided according to the present embodiment to form between the wall 20 and the upper cartridge 6 spaces of minimized height permitting passage of the torsion spring 5. This assures the two features of reducing the likelihood of extraneous matter ingressing into the cartridge 6 and realizing an efficient work procedure for installing the torsion spring 5 in place.

Although the spaces G, H are formed by the upper cartridge half segment 3 and the protective wall 20 positioned inwardly of the insertion opening 31 according to the embodiment described, the insertion opening 31 may be shaped in conformity with the shapes of the spaces G, H without providing the protective wall 20.

It appears feasible to replace the torsion spring 5 by a plate spring or tension spring for biasing the shutter 4 in the closing direction. However, the use of the plate spring requires the step of fixing one end of the spring to the cartridge 6 inside thereof after the insertion of the spring into the cartridge 6, hence a poor work efficiency. A low work efficiency also results in the case of the tension spring since there is a need to attach a hook to the shutter 4 after the spring is inserted into the container 6. The torsion spring 5 is therefore used for biasing the shutter 4 in the closing direction to ensure an improved work efficiency.

INDUSTRIAL APPLICABILITY

The torsion spring 5 is inserted into the cartridge through a space formed between the upper cartridge half segment 3 and the protective wall while leaving a small clearance. Thus, the space is given a minimum height enabling the torsion spring 5 to pass through the space.

The height thus minimized diminishes the space that would permit extraneous matter to enter the cartridge 6 therethrough from outside, reducing the likelihood of such matter ingressing into the cartridge 6. The torsion spring 5 is inserted into and attached to the cartridge 6 for biasing the shutter 4 in the closing direction and therefore automatically closes the shutter 4 even if the shutter is opened inadvertently.

What is claimed is:

1. A cartridge comprising upper and lower half segments butting against each other and containing a disk, the cartridge half segments being provided on one side thereof with a shutter for exposing or alternatively enclosing the disk, a torsion spring being attached to the shutter for biasing the shutter in a closing direction, the cartridge being characterized in that:

an insertion opening is formed in a side portion of the assembly of the butting half segments for permitting insertion of the torsion spring therethrough from outside, a protective wall being provided upright on said side of the half segments between the insertion opening and the disk to define a space by an upper end face of the protective wall and the half segment, the space being so sized as to permit the torsion spring to pass therethrough while leaving a small clearance, with legs thereof directed laterally, the space comprising a space H permitting a coil portion to pass therethrough while leaving a small clearance and a space G having a smaller width than the space H for permitting each of the legs to pass therethrough, the space H and the space G being arranged along the direction of opening or closing of the shutter.

2. A cartridge comprising upper and lower half segments butting against each other and containing a disk, the cartridge half segments being provided on one side thereof with a shutter for exposing or alternatively enclosing the disk, a torsion spring being attached to the shutter for biasing the shutter in a closing direction, the cartridge being characterized in that:

an insertion opening is formed in a side portion of the assembly of the butting half segments for permitting insertion of the torsion spring therethrough from outside, the insertion opening being so sized as to permit the torsion spring to pass therethrough while leaving a small clearance, with legs thereof directed laterally, the insertion opening comprising a space H permitting a coil portion to pass therethrough while leaving a small clearance and a space G having a smaller width than the space H for permitting each of the legs to pass therethrough, the space H and the space G being arranged along the direction of opening or closing of the shutter.

* * * * *